United States Patent [19]

Sguazzin

[11] 4,190,279

[45] Feb. 26, 1980

[54] CLAM RAKE

[76] Inventor: Aldo Sguazzin, 115 Aspen Rd., Mastic Beach, N.Y. 11951

[21] Appl. No.: 953,418

[22] Filed: Oct. 23, 1978

[51] Int. Cl.$^2$ ............................................... E02F 5/00
[52] U.S. Cl. ........................................ 294/49; 37/119
[58] Field of Search ................ 294/49, 19 R, 55, 55.5, 294/59; 37/119; 43/11

[56] References Cited

U.S. PATENT DOCUMENTS

| 1,782,493 | 11/1930 | Anderson | 37/119 |
| 3,394,483 | 7/1968 | Taglioli | 37/119 |

*Primary Examiner*—James B. Marbert
*Attorney, Agent, or Firm*—Stanley Ira Laughlin

[57] ABSTRACT

A clam rake employing side skids having raking teeth extending downward therefore preventing clams from escaping from the basket through the sand.

3 Claims, 5 Drawing Figures

CLAM RAKE

BACKGROUND OF THE INVENTION

The invention relates to clam harvesting implements, and in particular to clam dredges and rakes such as classified in Class 37, Subclass 119.

Clam rakes and dredges such as discussed in U.S. Pat. No. 97,420 issued Nov. 30, 1869 to T. F. Mayhew, U.S. Pat. No. 820,595 issued May 15, 1906 to Norton, U.S. Pat. No. 1,001,700 issued Aug. 29, 1911 to C. M. Snow and U.S. Pat. No. 1,413,944 issued Apr. 15, 1922 to H. R. Sockwell are well-known.

U.S. Pat. No. 1,141,425 issued June 1, 1915 to M. P. Simas described clam rakes improved by the addition of side plates to prevent the clams from dropping out of the basket.

U.S. Pat. No. 1,782,497 issued Nov. 25, 1930 to H. O. Anderson describes the clam rake as having an elliptical metallic basket with teeth extending along its front.

U.S. Pat. No. 2,035,799 issued Mar. 31, 1936 to C. A. Dippel describes the clam rake, as it exists today, employing a rectangularly shaped basket.

It is an object of Applicant's inventions to improve clam rakes, simply, economically, and safely.

It is also an object of Applicant's invention to provide an improvement to clam rakes without extensive modifications.

It is a further object of Applicant's invention to provide an improvement to clam rakes that are efficient and practical.

SUMMARY OF THE INVENTION

The invention relates to an improvement for clam rakes that provides raking teeth to the side skids for penetrating the sand, thereby preventing the clams from slipping out of the basket. The teeth increase in length from the handle edge of the basket to the full length of the teeth in front of the basket and may be bolted, welded, or otherwise fastened to the side skids.

DETAILED DESCRIPTION OF APPLICANT'S INVENTION

Figure 1:
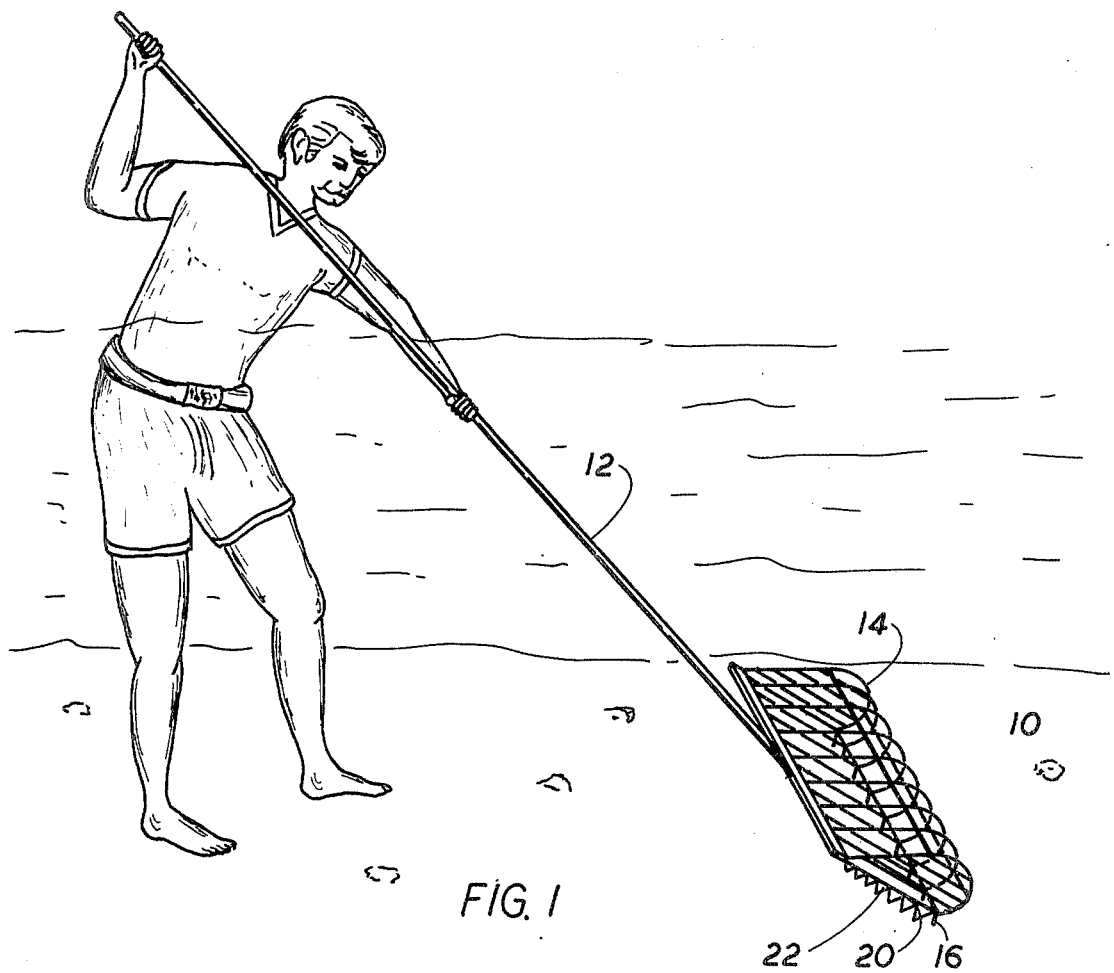
FIG. 1, shows a perspective view of Applicant's improved clam rake in use to harvest clams.
Figure 2:
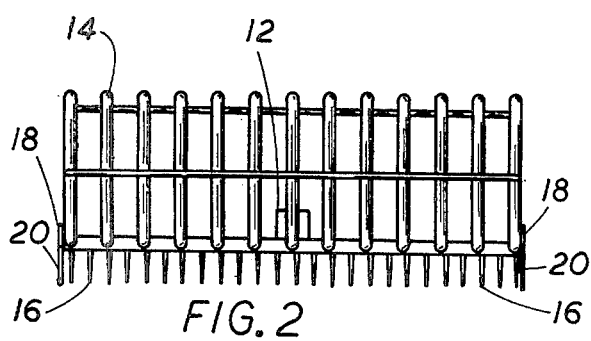
FIG. 2, is a front elevation of the improved clam rake shown in FIG. 1.
Figure 3:
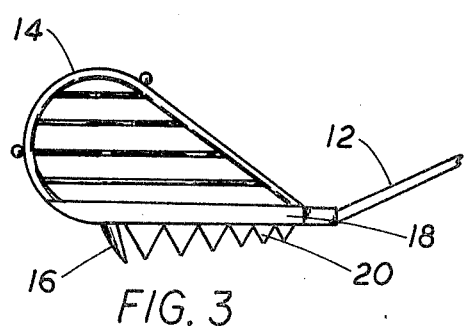
FIG. 3, is a side elevation view of the improved clam rake shown in FIG. 1.
Figure 4:
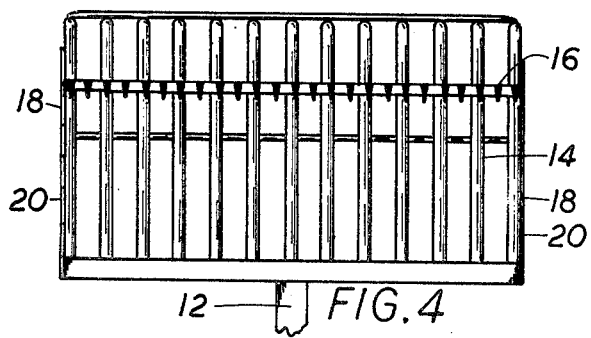
FIG. 4, is a top view of the improved clam rake shown in FIG. 1.

FIG. 1, shows Applicant's improved clam rake 10 in use to rake up clams and other delicacies such as scallops and oysters who inhabit the sand and mud at the bottom of shallow waters. The prior art clam rakes have a handle 12, a basket 14 usually of heavy gauge wire, raking teeth 16 and skids 18. The handle 12, basket 14, raking teeth 16 and skids 18 are also shown in FIGS. 2, 3 & 4, front and side elevations & top plan views, respectively, of Applicant's improved clam rake 10.

Figure 5:
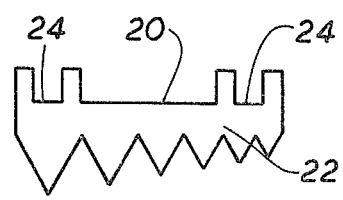
FIG. 5, is a detailed drawing of one embodiment of Applicant's invention.

One of the problems of the prior art clam rakes is that they are not very efficient, as many of the clams are able to escape from the basket through the sand at the open sides of the rake under the sand. Applicant's invention closes this escape route without impeding the operation of the rake by the use of a plurality of fingers affixed to the skids. FIG. 5, shows in detail Applicant's inventive structure 20 having teeth 22 which are the same length as raking teeth 16 at the front and continually diminish as to their length as they extend from side skids until they have no extending length at the back of handle edge of the skid 18. Apertures 24 may be used to fasten the structure to the skids 18 by means of screws (not shown). Other conventional fastening means may be used.

Obviously, although Applicant's drawings only show a tooth like sheet metal structure, a wire raking section, diminishing from the front end to its rear would work just as well. There is no difference in the use of the improved clam rake as compared with the prior art clam rake, but the results achieved are noticeable.

Although Applicant's inventive improvement has been shown in only one embodiment, it is contended that Applicant's invention should not be so limited. The breadth and scope of Applicant's invention should be limited only by the breadth and scope of the claims annexed hereto:

I claim:

1. A clam rake comprising a handle, a rectangular basket framed of heavy gauge wire affixed to said handle at one of the longer edges of said rectangular frame, a plurality of raking teeth affixed to the other longer edge of said rectangular frame, side skids being affixed to the shorter edges of said rectangular frame and a plurality of fingers affixed to said skids, the length of said fingers being the same as the raking teeth at the end of sid shorter edge in proximity to said raking teeth and said fingers diminishing in length as said shorter edge approaches the end of the shorter edge in proximity to the handle.

2. A clam rake as claimed in claim 1 wherein said fingers comprise metal extensions.

3. A clam rake as claimed in claim 1 wherein said fingers comprise wire extensions.

* * * * *